United States Patent
Mao et al.

(10) Patent No.: US 10,029,669 B2
(45) Date of Patent: Jul. 24, 2018

(54) POWERTRAIN AND METHOD OF COORDINATING CHASSIS AND PROPULSION SYSTEM TORQUE LIMITS

(71) Applicant: GM GLOBAL TECHNOLOGY OPERATIONS LLC, Detroit, MI (US)

(72) Inventors: Xiaofeng Mao, Novi, MI (US); Thomas A. Klingler, Lake Orion, MI (US); Eric E. Krueger, Chelsea, MI (US); William R. Cawthorne, Milford, MI (US); R. Travis Schwenke, Springboro, OH (US); Scott C. Mrdeza, Lennon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 224 days.

(21) Appl. No.: 14/942,035

(22) Filed: Nov. 16, 2015

(65) Prior Publication Data

US 2017/0137012 A1     May 18, 2017

(51) Int. Cl.
*B60W 20/10*     (2016.01)
*B60K 6/40*      (2007.10)
(Continued)

(52) U.S. Cl.
CPC ............. *B60W 20/10* (2013.01); *B60K 6/40* (2013.01); *B60K 6/52* (2013.01); *B60W 10/06* (2013.01); *B60W 10/08* (2013.01); *B60W 10/26* (2013.01); *B60W 30/02* (2013.01); *B60W 30/18172* (2013.01); *B60W 20/00* (2013.01); *B60W 2510/244* (2013.01); *B60W 2520/10* (2013.01); *B60W 2520/14* (2013.01); *B60W 2520/26* (2013.01); *B60W 2520/28* (2013.01); *B60W 2540/00* (2013.01); *B60W 2540/18* (2013.01); *B60W 2710/0666* (2013.01); *B60W 2710/083* (2013.01); *B60W 2710/244* (2013.01); *B60W 2720/403* (2013.01); *B60Y 2200/92* (2013.01); *B60Y 2300/182* (2013.01); *B60Y 2300/188* (2013.01); *Y02T 10/6265* (2013.01);
(Continued)

(58) Field of Classification Search
CPC .......................................... B60W 20/10–20/19
See application file for complete search history.

(56) References Cited

U.S. PATENT DOCUMENTS

| | | | | |
|---|---|---|---|---|
| 2011/0257826 A1* | 10/2011 | Yu | .......................... | B60K 6/448 701/31.4 |
| 2015/0073674 A1* | 3/2015 | Kelly | .............. | B60W 30/18027 701/69 |

* cited by examiner

*Primary Examiner* — Genna M Mott
(74) *Attorney, Agent, or Firm* — Quinn IP Law (57) ABSTRACT

A powertrain includes a propulsion system having first and second torque sources, and first and second drive axles respectively connected to and independently driven by the first and second torque sources. A permissible range of torque contribution from the torque sources to the respective first and second drive axles is defined by a component torque window. The powertrain includes sensors for detecting a dynamic driving maneuver of a vehicle having the powertrain. A controller executes a method to adjust a size and/or orientation of a chassis torque window during the detected dynamic driving maneuver, determine an optimally efficient axle torque operating point that falls on a torque line within the component torque window in proximity to the chassis torque window, and command the torque contribution via transmission of torque control signals to the first and second torque sources to achieve the optimally efficient axle torque operating point.

20 Claims, 6 Drawing Sheets

(51) Int. Cl.
*B60K 6/52* (2007.10)
*B60W 10/06* (2006.01)
*B60W 10/08* (2006.01)
*B60W 10/26* (2006.01)
*B60W 30/02* (2012.01)
*B60W 30/18* (2012.01)
*B60W 20/00* (2016.01)

(52) U.S. Cl.
CPC ........ *Y02T 10/6286* (2013.01); *Y02T 10/7258* (2013.01); *Y10S 903/905* (2013.01); *Y10S 903/906* (2013.01); *Y10S 903/907* (2013.01); *Y10S 903/916* (2013.01)

POWERTRAIN AND METHOD OF COORDINATING CHASSIS AND PROPULSION SYSTEM TORQUE LIMITS

TECHNICAL FIELD

The present disclosure pertains to a powertrain and a method for coordinating chassis and propulsion system torque limits.

BACKGROUND

Conventional vehicle powertrains deliver torque from an internal combustion engine to one or more drive axles. Electric powertrains power the drive axle(s) using motor torque from an electric machine. Hybrid vehicle powertrains selectively deliver torque from the engine and/or electric machine(s) in a particular combination depending on the hybrid operating mode. Output torque from a transmission may be delivered to front, rear, or all drive wheels depending on the vehicle configuration.

In a powertrain having independently-powered drive axles, such as an electric all-wheel drive system delivering motor torque to the front or rear drive axle as needed while an engine independently powers the other drive axle, a driver-requested torque is determined as a function of accelerator pedal angle, force, or travel as a torque line in a two-dimensional space as opposed to a single torque point. The torque line describes the sum of all possible axle torque combinations for a given set of inputs. The driver-requested torque can be realized via either on a single drive axle or divided between drive axles. During normal driving, a controller calculates an optimally efficient torque operating point located on the torque line, and commands an axle torque combination that is sufficient for achieving optimal vehicle performance efficiency.

The torque-generating components of a given vehicle propulsion system also have corresponding torque limits. Such component torque limits are typically based on battery, motor, and power inverter temperatures, motor speeds, battery voltage or electrical current, and other factors. However, during a dynamic driving maneuver, such as during aggressive cornering or hard braking, the particular axle torque combination that would ordinarily achieve optimal fuel efficiency may not provide optimal vehicle dynamics performance, e.g., traction and stability. In other words, it may not always be possible to fully satisfy component torque limits and vehicle chassis dynamic performance requirements for a given driver-requested torque point in a powertrain having independent axle torque sources.

SUMMARY

A method is disclosed herein that is intended to help address the above-noted control problem in a powertrain having independent sources of axle torque. The method functions by automatically coordinating chassis performance requirements and propulsion system component torque limits in such a powertrain. As part of the method and underlying powertrain structure, a controller detects a dynamic driving maneuver and selectively controls the size and/or orientation of an axle torque window based on chassis system dynamic requirements. As a result of the method, the controller may automatically modify a torque split between the front and rear drive axles so as to optimally balance powertrain acceleration requirements with overall fuel efficiency and dynamics performance.

The controller operates in part by transmitting torque control signals to one or both of the independent torque sources to selectively modify a torque command, thus helping to ensure an acceptable level of chassis dynamics performance is maintained during the dynamic driving maneuver. That is, if in the control logic it appears to the controller that the chassis would tend toward degraded performance during the dynamic driving maneuver, the controller automatically adjusts torque limits of the propulsion system components so as to maintain vehicle dynamics performance within an acceptable envelope. If the driver-requested torque would tend to push vehicle dynamics performance beyond such a performance envelope, imposition of the new torque limits results in a reduced torque command to the torque sources to help bring vehicle dynamics performance back within the performance envelope.

In a particular embodiment, a powertrain system includes a propulsion system having first and second torque sources, as well as first and second drive axles that are respectively connected to and independently driven by the first and second torque sources. A permissible range of torque contribution from the first and second torque sources to the respective first and second drive axles is defined by a component torque window. The powertrain system also includes a controller and sensors operable for detecting a dynamic driving maneuver of a vehicle having the powertrain.

The controller is programmed to adjust a size and/or orientation of a chassis torque window during the detected dynamic driving maneuver, and to determine an optimally efficient axle torque operating point that falls on a permissible torque line in proximity to the chassis torque window. As used herein, "chassis torque window" refers to dynamics performance-based torque limits of components used in the propulsion system, i.e., torque limits assigned to provide an acceptable level of vehicle dynamics performance. The controller also commands the torque contribution via transmission of torque control signals to the first and second torque sources to achieve the optimally efficient axle torque operating point.

The controller may command a reduction in a level of torque commanded by the torque control signals to one or both of the torque sources, and thus the drive axles.

The sensors may include speed sensors, a yaw rate sensor, an accelerator pedal sensor, and a steering angle sensor.

The controller may optionally receive a selected driving mode from a drive mode selection device, and adjust the torque contribution such that the optimally efficient axle torque operating point falls entirely outside of the chassis torque window.

In some embodiments, the controller may adjust the torque contribution in response to a state of charge, capacity, and temperature of an energy storage system.

A method is also disclosed for coordinating torque limits of a chassis and a propulsion system of a vehicle having first and second drive axles. The propulsion system includes first and second torque sources respectively connected to and independently powering the first and second drive axles. A permissible range of a torque contribution of the first and second torque sources to the respective first and second drive axles is defined by a component torque window. The method in this example embodiment includes adjusting a size and/or orientation of a vehicle dynamics-based chassis torque window via a controller during a dynamic driving maneuver, and determining an optimally efficient axle torque operating point that falls on a permissible torque line within the component torque window in proximity to the chassis torque window. Additionally, the method includes selectively adjusting the torque contribution from the torque sources via transmission of control signals to the first and second torque sources.

The above noted and other features and advantages of the present disclosure will be readily apparent from the following detailed description of the preferred embodiments and best modes for carrying out the present disclosure when taken in connection with the accompanying drawings and the appended claims.

DETAILED DESCRIPTION

Figure 1:
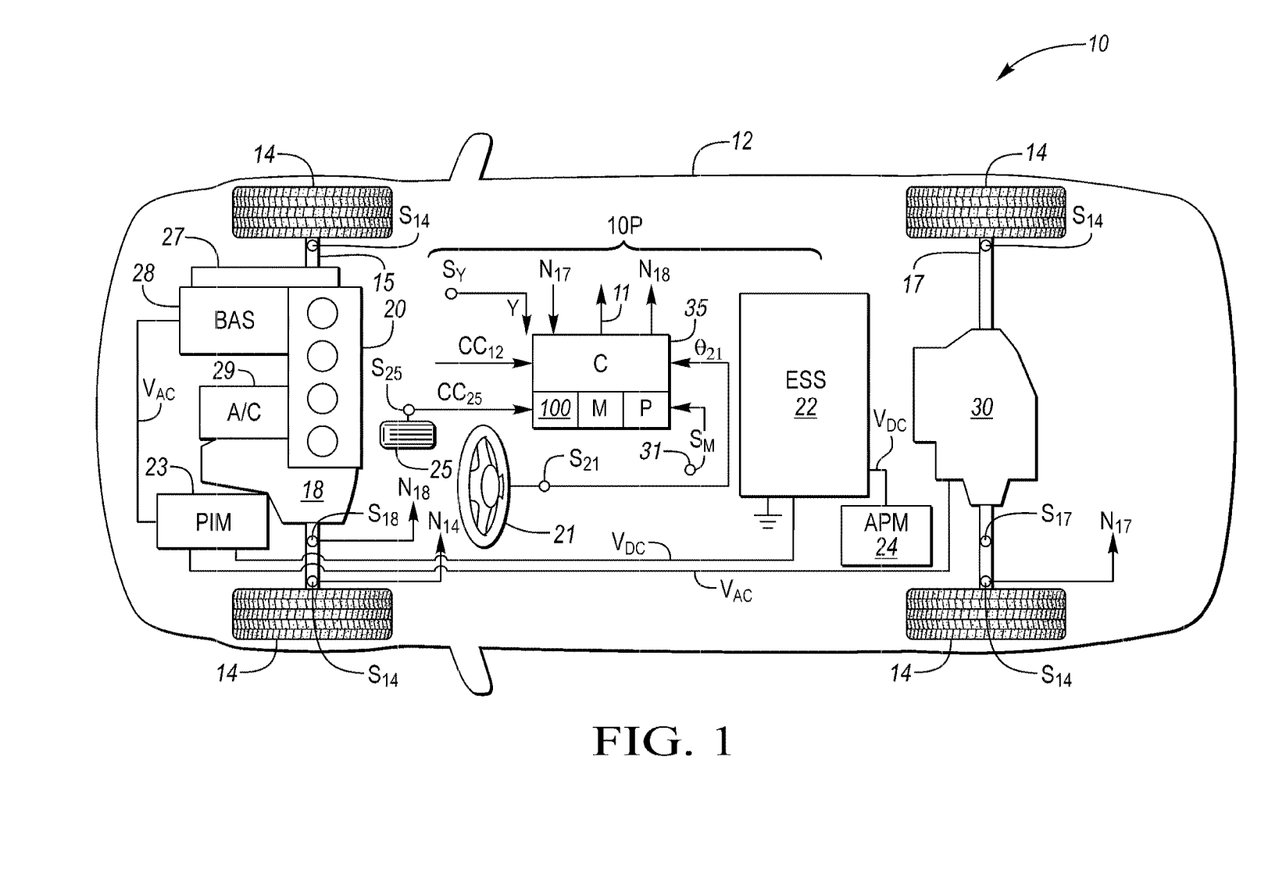
FIG. 1 is a schematic illustration of an example vehicle having multiple independent axle torque sources and a controller programmed to coordinate chassis and propulsion system torque requirements aboard the vehicle.

Referring to the Figures, a powertrain 10P is shown in FIG. 1 for an example vehicle 10 having a chassis 12, a transmission 18, and respective front and rear drive axles 15 and 17. The drive axles 15 and 17 are each separately and independently driven via a respective axle torque source, such as via an internal combustion engine (E) 20 and an electric machine 30, e.g., an electric traction motor or motor/generator unit, in the non-limiting example embodiment of FIG. 1. The electric machine 30 may be part of an electric all-wheel drive (eAWD) system of the type known in the art. While a rear eAWD embodiment is depicted in FIG. 1, with the transmission 18 and engine 20 connected to the drive axle 15, in other embodiments the electric machine 30 may power the drive axle 15 of FIG. 1 in a front eAWD variant, or both of the drive axles 15 and 17 may be electrically driven by separate electric machines 30 without the use of the engine 20.

A controller (C) 35 of the vehicle 10 is programmed to execute instructions embodying a method 100 for coordinating chassis and propulsion system torque requirements. In general, the controller 35 is programmed to detect a dynamic driving maneuver by processing electronic signals from sensors as explained below. The controller 35 then selectively adjusts and applies torque limits to the drive axles 15 and/or 17 as needed to so as to optimize the dynamic driving performance, possibly at the temporary expense of powertrain efficiency.

As described below with particular reference to FIGS. 2A-6, the controller 35 effectively sets or adjusts a size and/or orientation of a calculated chassis torque window, i.e., propulsion system torque limits defined by calibrated or desired vehicle dynamics performance requirements of the vehicle 10, and then finds an optimally efficient axle torque operating point along a two-dimensional torque line of the type noted above and shown in FIGS. 2A-6. The optimally efficient axle torque operating point optimizes stability of the chassis 12 while still providing, to the extent possible, a driver-requested torque. In general, the controller 35 determines a chassis torque window, shown at 42 in FIGS. 2A-6, particularly during a dynamic driving maneuver of the vehicle 10 but also during normal driving conditions, and determines an optimally efficient axle torque operating point.

The optimally efficient axle torque operating point falls within a torque capability range of components of the propulsion system, hereinafter referred to as a component torque window as shown at 44 in FIGS. 3-6, in proximity to the chassis torque window 42, e.g., a closest attainable proximity to the chassis torque window 42 that does not defy component torque limits of the propulsion system components such as the engine 20 and electric machine 30. The controller 35 ultimately commands a particular torque contribution from the available torque sources by transmission of torque control signals (arrow 11). An example embodiment of the method 100 is described below with reference to FIGS. 7A and 7B.

The controller 35 of FIG. 1 may be embodied as a digital computer having a processor (P) and memory (M). The memory (M) includes sufficient amounts of tangible, non-transitory memory, e.g., read only memory, flash memory, optical and/or magnetic memory, electrically-programmable read only memory, and the like. Memory (M) also includes sufficient transient memory such as random access memory, electronic buffers. Hardware of the controller 35 includes a high-speed clock, analog-to-digital and digital-to-analog circuitry, and input/output circuitry and devices, as well as appropriate signal conditioning and buffer circuitry.

With respect to the structure of the vehicle 10, possible configurations may include a belted alternator-starter (BAS) system 28 that selectively delivers motor torque to the engine 20 via a drive element 27 such as a belt and pulley system. The BAS system 28 may be used to help crank and start the engine 20, as is well known in the art. While not shown in FIG. 1, the vehicle 10 may alternatively include an auxiliary starter motor or a flywheel alternator starter.

The vehicle 10 may include other components such as a direct current (DC) high-voltage energy storage system (ESS) 22, e.g., a high-voltage multi-cell battery and associated power electronics, and a power inverter module (PIM) 23. The PIM 23 is electrically connected to the BAS system 28 via an alternating current (AC) bus $V_{AC}$, and to the electric machine 30 via a DC bus having a voltage $V_{AC}$. As is known in the art, a power inverter such as the PIM 23 is operable for converting DC voltage into AC voltage and vice versa, typically via pulse width modulation or other rapid semiconductor switching techniques, as well as any required power filtering and conditioning elements. An air conditioning (A/C) unit 29 may be included as one possible electrical load on the ESS 22. Other electrical loads could include an auxiliary power module (APM) 24 operable for regulating a DC voltage from the ESS 22 to a lower voltage suitable for powering auxiliary loads aboard the vehicle 10.

The controller 35 is in communication with various sensors or devices aboard the vehicle 10. The sensors may include axle speed sensors $S_{17}$ and $S_{18}$, wheel speed sensors $S_{14}$, a steering angle sensor $S_{21}$ positioned with respect to a steering wheel 21, a pedal sensor $S_2$ positioned with respect to an accelerator pedal 25, and a yaw rate sensor $S_Y$ positioned on the chassis 12. The axle speed sensors $S_{17}$ and $S_{18}$ respectively measure speed signals (arrow $N_{17}$ and $N_{18}$). Likewise, the steering angle sensor $S_{21}$ measures a steering angle (arrow $\theta_{21}$) while the pedal sensor $S_{25}$ and yaw rate sensor respectively measure a pedal position and a yaw rate (arrows $CC_{25}$ and Y, respectively). The wheel speed sensors $S_{14}$ may be used to measure individual wheel speeds $N_{14}$, which the controller 35 can use to determine wheel slip as part of the method 100, particularly when sizing and orientating chassis torque limits.

A driving mode signal (arrow $S_M$) may be received from an optional drive mode selection device 31, e.g., a mode selector switch, touch screen device, push button device, or dial, or may be determined autonomously, to provide for different levels of powertrain control flexibility in the execution of method 100 as described below. For instance, a "tour mode" may be used to provide a highly stable mode of operation for the chassis 12, while a "track mode" or "sport mode" could allow the controller 35 more leeway in permitting the vehicle 10 to achieve higher performance limits at the possible temporary expense of optimal stability. Likewise, the design of the vehicle 10, whether a high-performance sport vehicle, race car, off-road vehicle, luxury sedan, or passenger van, can color the degree to which the controller 35 sets the size and orientation of the chassis torque window 42 described herein.

Additionally, the controller 35 of FIG. 1 determines chassis torque limits (arrow $CC_{12}$), e.g., from a separate body control module for the chassis 12 as known in the art, and ultimately adjusts the size and/or orientation of a calculated axle torque window based on the present dynamic performance requirements of the vehicle 10. Torque control signals (arrow 11) determined via the method 100 are ultimately transmitted by the controller 35 to one or both of the independent torque sources to adjust the torque contribution of the torque sources.

Figure 2A:
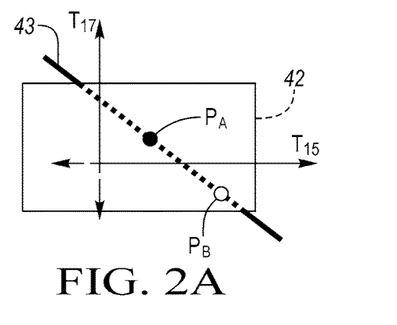
FIGS. 2A-D are schematic illustrations of example driving maneuvers and resultant chassis torque window size or orientation adjustments as controlled according to the method set forth herein, with rear axle torque depicted on the vertical axis and front axle torque depicted on the horizontal axis.

FIGS. 2A-2D collectively describe example driving scenarios in which the axle torque capabilities of propulsion system components of vehicle 10 are known by or available to the controller 35. The controller 35 may adjust the size and/or orientation of the chassis torque window 42. For instance, FIG. 2A depicts an example cruising condition on a road surface having a high coefficient of friction, e.g., while highway driving on dry pavement. Torque line 43 represents the two-dimensional range of torque combinations from the drive axles 15 and 17 that achieve the driver's requested torque, with rear axle torque $T_{17}$ equal to the driver-requested torque minus the front axle torque $T_{15}$ in the embodiment of FIG. 1.

The portion of the torque line 43 lying within the chassis torque window 42 is the optimized torque contribution as determined from a vehicle dynamics standpoint. Axle torque operating point $P_A$ shows a situation in which both drive axles 15 and 17 provide traction force. Axle torque operating point $P_B$ depicts more torque on the front axle 15 than a driver-requested torque, with the negative torque on the rear axle, in FIG. 1 driven via electric machine 30, used for regeneration of the ESS 22. Thus, the selected mode can move the optimally efficient axle torque operating point anywhere that is required within the boundaries of the chassis torque window 42 during non-dynamic driving maneuvers.

Figure 2B:
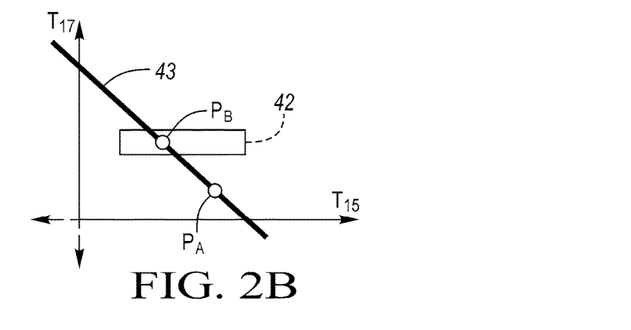
Figure 2C:
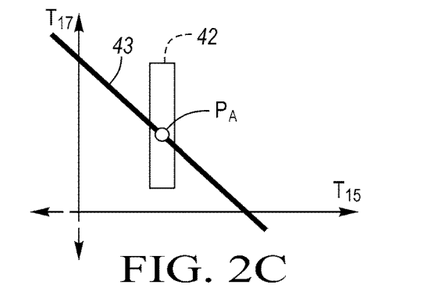
Figure 2D:
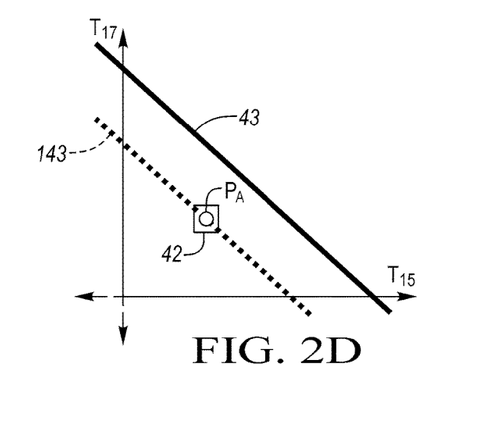

FIG. 2B depicts a scenario in which the drive wheels 14 on the drive axles 15 of FIG. 1 are slipping. The chassis torque window 42 is reduced in size relative to FIG. 1 by operation of the controller 35 and method 100. Point $P_A$ represents a simplified example 80/20 torque split. This point $P_A$ is moved to a new point $P_B$ within the chassis torque window 42, e.g., to a 20/80 torque split. Similarly, FIG. 2C depicts the drive wheels 14 slipping on the drive axle 17. The size and orientation of the chassis torque window 42 is changed by operation of the controller 35 relative to FIG. 2A. The chassis torque window 42 could shrink even more, such that the chassis torque window 42 effectively reduces to point $P_B$ when heavy acceleration is experienced during a turning maneuver. FIG. 2D depicts a vehicle slide slip condition in which the controller 35 must reduce torque to both drive axles 15 and 17, effectively shifting the torque line 43 to a new location as indicated by adjusted torque line 143. These and other control operations affecting the size and/or orientation of the chassis torque window 42 are possible within the scope of the present disclosure.

Other scenarios may be envisioned in which the axle torque capability is not available to the controller 35. In those instances, the controller 35 can adjust the chassis torque window 42 such that the chassis torque window 42 encompasses the origin, i.e., a point of zero torque contribution on each drive axle 15 and 17. In such a situation the controller 35 can move an axle torque operating point to a point of intersection between the driver-requested torque line and the boundary of the chassis torque window 42 or within the window 42. For instance, if the front drive wheels 14 slip, and if an 80/20 torque split torque operating point lies outside of the boundaries of the chassis torque window 42, the torque operating point may be adjusted by the controller 35 to require a greater torque contribution from the non-slipping axle.

Figure 5:
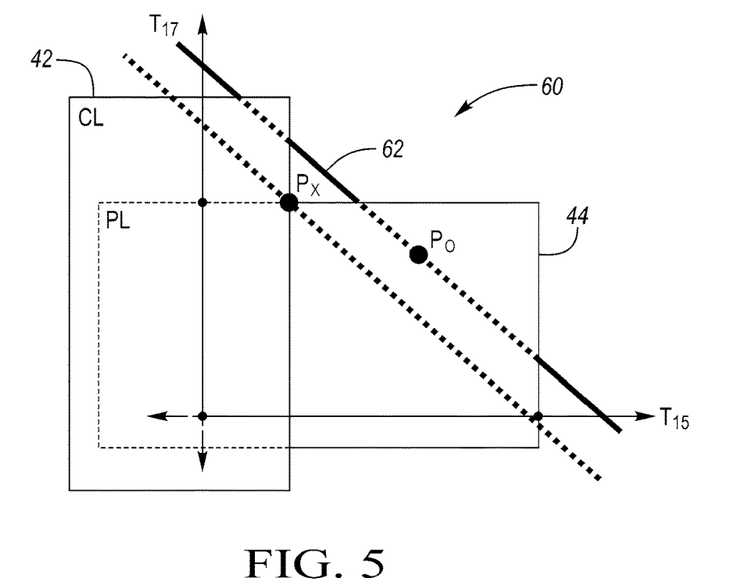
Figure 6:
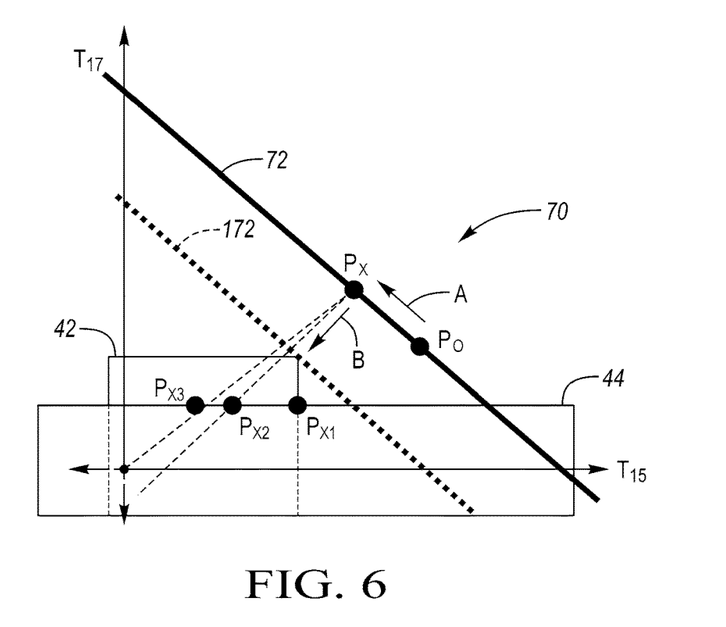
Figure 7A:
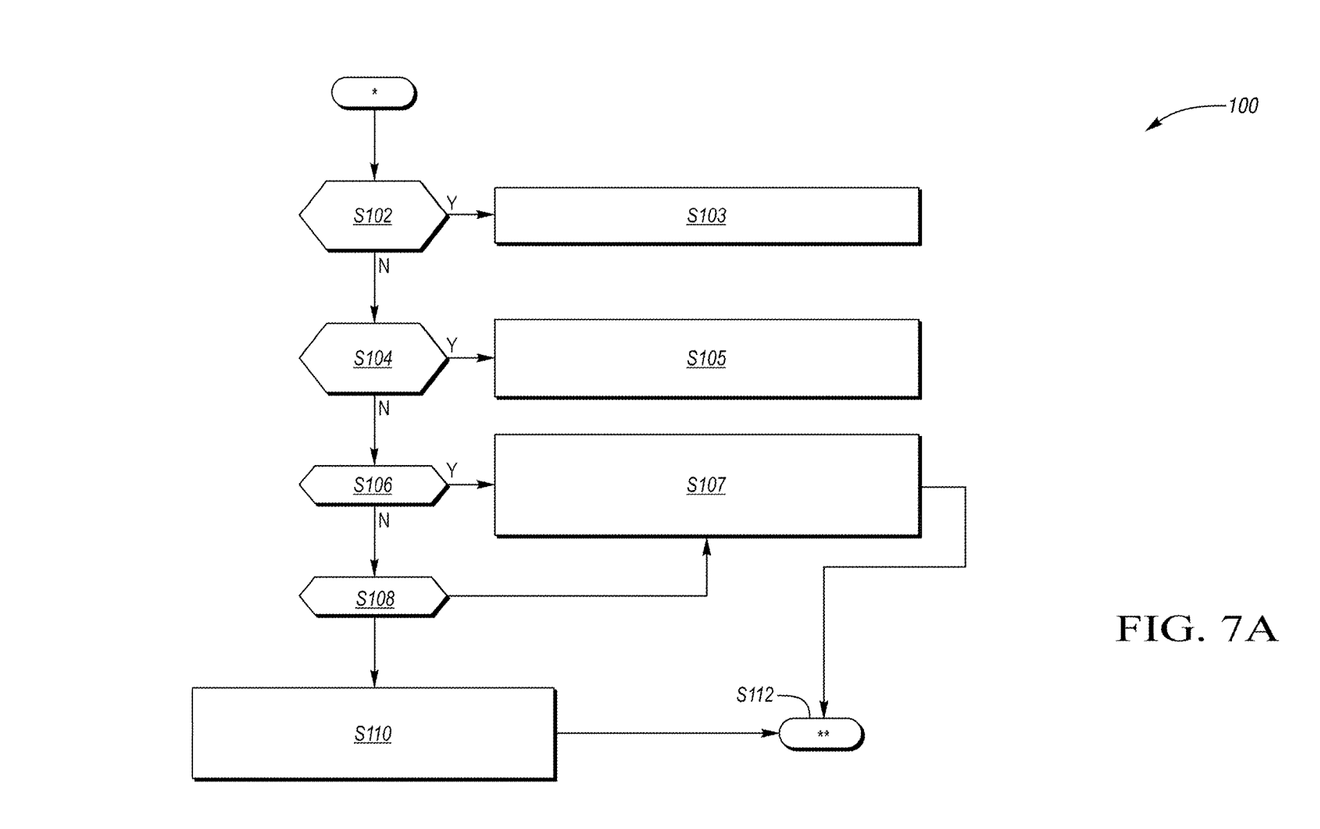
FIGS. 7A-7B together provide a schematic flow chart describing an example embodiment of the method executed via the controller of FIG. 1.
Figure 7B:
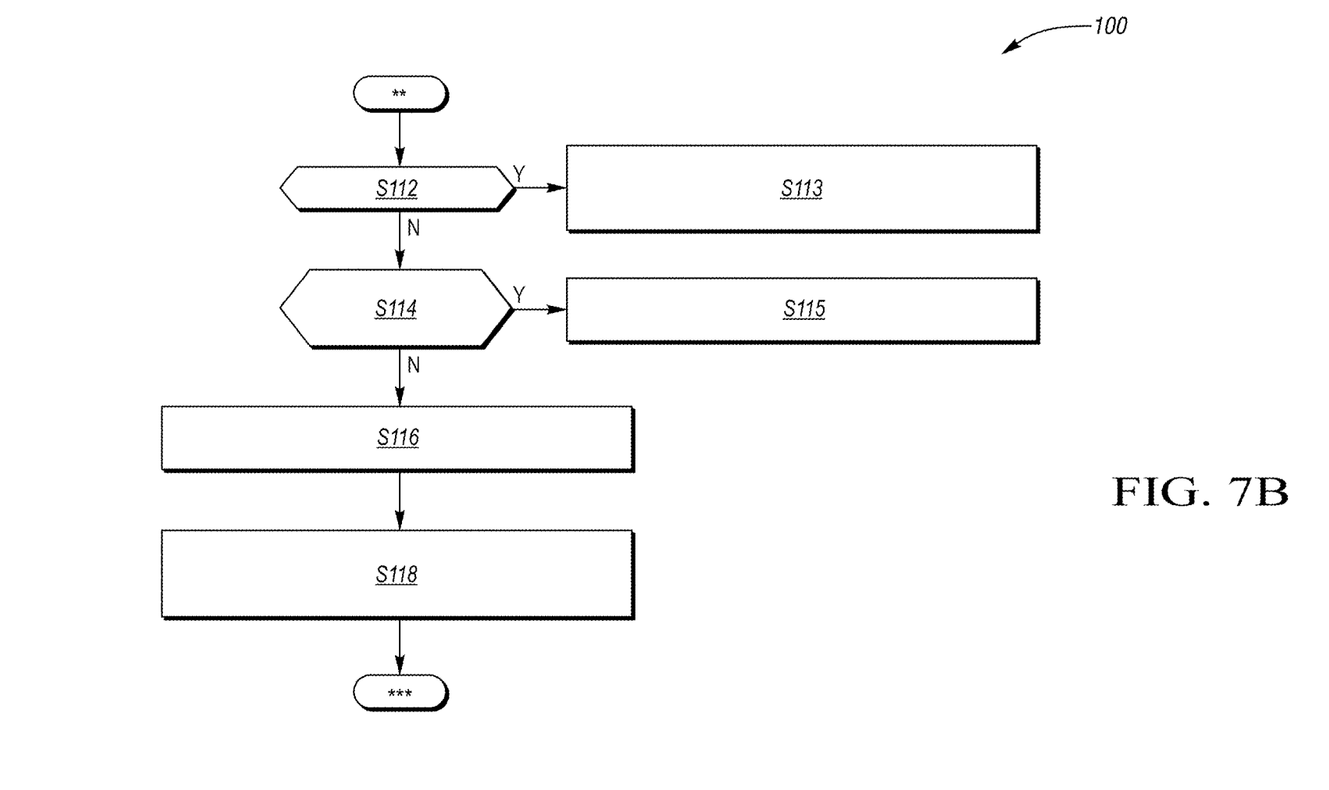

FIGS. 3-6 and the method 100 of FIGS. 7A-7B describe the present method 100 as it is applied to the vehicle 10 shown in FIG. 1. In general terms, the controller 35 executes instructions embodying the method 100 in one of two possible manners depending on the availability of information needed to calculate the torque capability of the independent torque sources powering the drive axles 15 and 17. If this information is available, the controller 35 calculates a suitably sized and oriented axle torque window, i.e., the component torque window 44 shown in FIGS. 3-6, and locates the chassis torque window 42 relative to a driver-requested torque determined as a function of the pedal position (arrow $CC_{25}$) and measured axle speeds (arrow $N_{17}$ and $N_{18}$).

The controller 35 then automatically adjusts the size and/or orientation of the chassis torque window 42 based on the present dynamic state of the chassis torque limits (arrow $CC_{12}$), e.g., determined in terms of desired yaw rate, steering angle, vehicle speed, etc. If the present torque capability of each drive axle 15 and 17 cannot be fully ascertained, the component torque window 44 is instead set to contain its origin, i.e., a point where zero torque acts on both drive axles 15 and 17. Maximum control flexibility is provided to the controller 35 in this instance to allow the controller 35 to achieve a driver-requested torque as closely as possible while remaining within or in a closest attainable distance of the component torque window 44.

In either case, it is possible that the propulsion system components of the vehicle 10, for instance the engine 20 and the electric machine 30 of FIG. 1, may not be able to fully achieve the driver-requested torque while also satisfying torque limits imposed by a chassis control system (not shown). For instance, a motor-driven axle such as the drive axle 17 may have a more limited torque capability relative to an engine-driven drive axle such as drive axle 15. When this situation occurs, the chassis system helps determine how the propulsion system components can best achieve the driver-requested torque.

That is, the propulsion system components in the first approach are allowed to fall outside of the chassis torque limits of window 42, but still in proximity to the window 42, in order to achieve an acceptable level of drive performance, which itself may vary based on the design of the vehicle 10 and a selected drive mode, e.g., as determined via the mode signal (arrow $S_M$) from the mode selection device 31. In the second approach described above, if a certain torque split between the drive axles 15 and 17 is deemed necessary by the controller 35, the overall vehicle torque is reduced from the driver-requested torque level. If more leeway can be given in the torque split, that is, if the dynamic condition is not presently at its limit relative to the boundaries of the chassis torque window 42 of FIGS. 4-5, the driver-requested torque can be met with a sub-optimal dynamic torque split.

FIGS. 3-6 describe example applications of the method 100. In each of FIGS. 3-6, the rear axle torque ($T_{17}$) is plotted on the vertical axis and front axle torque ($T_{15}$) is plotted on the horizontal axis. Also, the chassis torque window 42 represents the boundaries of permissible torque distribution from the vehicle dynamics performance perspective of the chassis 12, while the component torque window 44 represents the boundaries of torque distribution from the perspective of the propulsion system components, e.g., the engine 20 and electric machine 30 of FIG. 1. The component torque window 44, which may be calculated as a function of the present torque capability of the engine 20 and electric machine 30, the electrical state of charge, temperature, powerflow, and/or other electrical or thermal parameters of the ESS 22, electrical load, etc., defines the limits of all possible torque distributions to the drive axles 15 and 17. The chassis torque window 42 is calculated based on dynamic information, including but not necessarily limited to the measured axle speeds (arrows $N_{17}$, $N_{18}$), desired yaw rate (arrow Y), and/or steering angle (arrow $\theta_{21}$).

Figure 3:
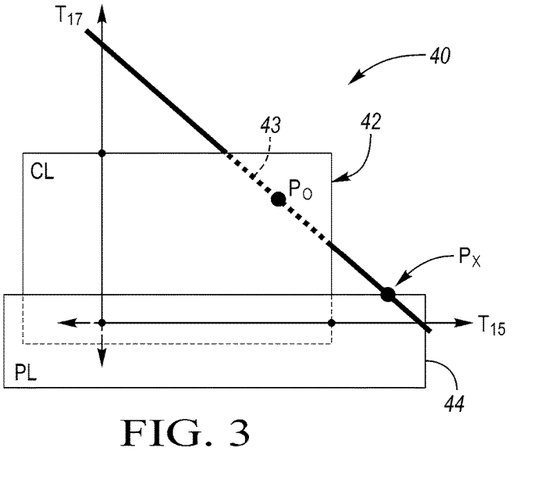
FIGS. 3-6 are schematic illustrations of additional driving maneuvers as controlled according to the method set forth herein.

FIG. 3 describes an example first condition 40 in which the controller 35 is permitted to selectively violate the limits of chassis torque window 42 defining chassis limits (CL) in a manner that depends on the type of vehicle 10, e.g., a high-performance vehicle, luxury sedan, cargo van, etc., and the selected drive mode (arrow $S_M$ of FIG. 1). For instance, a scenario may present itself in which the torque on the electrically-driven axle, such as the drive axle 17 of FIG. 1, is limited. This may occur when the state of charge of the ESS 22 is low, or during periods of low torque capacity of the electric machine 30. Torque line 43 represents the driver-requested torque line, i.e., the theoretically attainable torque distribution meeting the driver's request. Any point along the broken portion of torque line 43 lying within the chassis torque window 42 means that vehicle dynamics are optimized. If the electronically-driven drive axle 17 cannot achieve any point on torque line 43 outside of the limits of chassis torque window 42, more torque contribution is requested by the controller 35 of the other drive axle 15.

Axle torque operating point $P_O$ represents the most efficient driver-requested axle torque operating point along the driver-requested torque line 43. That is, a driver of the vehicle 10 of FIG. 1, by applying force to the accelerator pedal 25, requests a certain amount of output torque, and logic of the controller 35 determines the optimal distribution of front and rear axle torque to meet this request. However, as depicted in FIG. 3, the axle torque operating point $P_O$ lies well outside of the component torque window 44 defining the propulsion system limits (PL), and thus cannot be met within those limits.

In response to this condition, the controller 35 automatically adjusts the axle torque operating point $P_O$ along the driver-requested torque line 43 to an intersection with the boundaries of the component torque window 44, which is the closest-attainable position of the component torque window 44 with respect to the boundaries of the chassis torque window 42, with the new point indicated as axle torque operating point $P_X$ in FIG. 3. Thus, when the torque capability limits of the propulsion system components are fully known and demarcated by the component torque window 44, the controller 35 carefully balances acceleration performance and efficiency with chassis vehicle dynamics performance requirements, in this example by selectively reducing a torque command to the rear drive axle 17 and increasing the torque command to the front drive axle 15.

Figure 4:
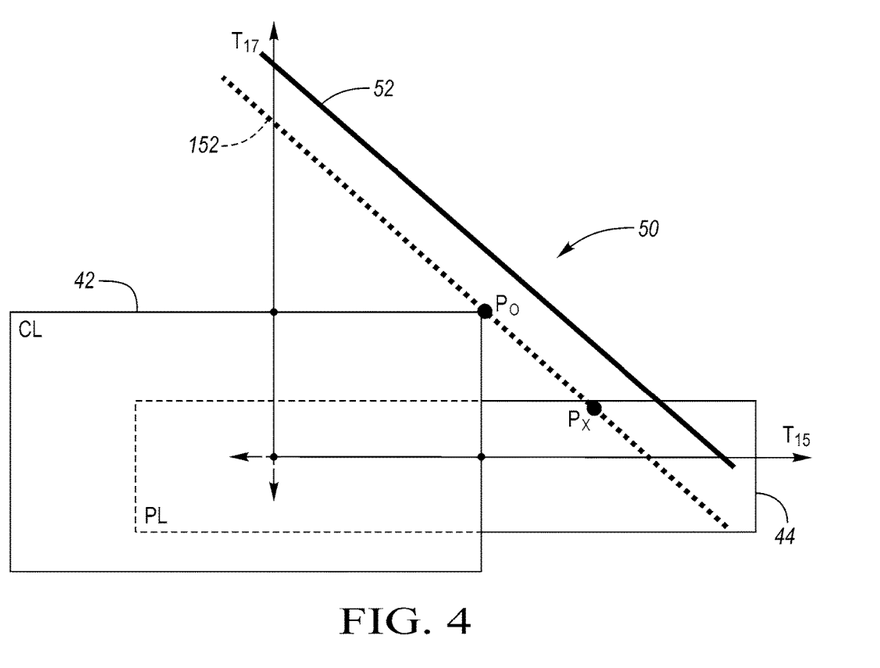

FIG. 4 depicts an example second condition 50 with a driver-requested torque line 52. However, the entire torque line 52 falls outside of the torque limits for the chassis 12, i.e., entirely outside of the boundaries of the chassis torque window 42. Such a condition may result when the driver requests excessive torque during periods of limited electronic axle torque capability. The controller 35 responds by adjusting the driver-requested torque line 52 as indicated by the adjusted torque line 152, until an intersection with chassis torque window 42 results, which occurs at axle torque operating point $P_O$.

However, axle torque operating point $P_O$, as with FIG. 3, still falls well outside of the propulsion system component limits demarcated by the component torque window 44. In this instance, the axle torque operating point $P_O$ is automatically shifted by the controller 35 along the adjusted driver-requested torque line 152 until there is an intersection with the component torque window 44, which occurs at axle torque operating point $P_X$ in FIG. 3. At point $P_X$, the driver-requested torque is met to the extent possible within the limits of the component torque window 44. Therefore, in the example of FIG. 4 the controller 35 of FIG. 1 automatically decreases a torque command to the torque source for the rear drive axle 17, e.g., the electric machine 30, and increases a torque command to the front drive axle 15, e.g., to the engine 20, but with an intermediate step of generating a new torque line.

FIGS. 5 and 6 describe example third and fourth conditions 60 and 70, respectively, each providing different approaches to controlling the second scenario noted above, i.e., when the present torque capability of each drive axle 15 and 17 cannot be fully ascertained. In these instances, the chassis torque window 42 is automatically set to contain the origin, i.e., with zero torque acting on both drive axles 15 and 17. FIG. 5 represents a situation in which the controller 35 is allowed to violate the chassis torque limits depending on the configuration of the vehicle 10 and the selected drive mode. For instance, a driver may select a "track" mode in which the chassis torque window 42 is set as a hard limit. The controller 35 then picks an operating point within both the chassis torque window 42 and the propulsion system component torque window 44.

The axle torque operating point $P_O$ in FIG. 5 lies within the permissible limits of the component torque window 44 but outside of the chassis torque window 42. The controller 35 therefore selects a new axle torque operating point $P_X$ within both of the torque windows 42 and 44, which may entail shifting the entire driver-requested torque line 62 downward to form new driver-requested torque line 162. In the example of FIG. 5, the controller 35 increases the torque command to the rear drive axle 17 and decreases the torque command to the front drive axle 15.

FIG. 6 represents the example condition 70 in which the controller 35 also treats the chassis torque window 42 as imposing hard torque limits at all times, again based on the selected drive mode (arrow $S_M$) using the input device 31 shown in FIG. 1. The controller 35 could maintain the driver-requested torque as much as possible, as indicated by axle torque operating point $P_{X1}$, or instead can maintain a calibrated difference between the front and rear axle torques $T_{17}$ and $T_{15}$, respectively, as indicated by axle torque operating point $P_{X2}$. Alternatively, the controller 35 could maintain a calibrated torque split ratio as indicated by axle torque operating point $P_{X3}$.

Thus, for a given axle torque operating point $P_O$ falling outside of the limits of the chassis torque window 42, and for a given set of vehicle dynamic input as measured by the sensors shown in FIG. 1, the controller 35 can automatically shift the axle torque operating point $P_O$ to a given axle torque operating point $P_X$, as indicated by arrow A, and then toward the component torque window 44 as indicated by arrow B, such that a shift of torque line 72 ultimately results in an adjusted torque line 172 intersecting a boundary or limit of the component torque window 44. The amount of shifting of the axle torque operating point $P_O$ depends on the selected drive mode, and therefore can be calibrated for execution by the controller 35. For all results, the resultant axle torque operating points $P_{X1}$, $P_{X2}$, and $P_{X3}$ lie within or on the boundaries of both of the torque windows 42 and 44. Other conditions other than those depicted in FIGS. 3-6 may be envisioned within the intended inventive scope.

Referring to FIGS. 7A and 7B, an example embodiment of the method 100 is run by the controller 35 for both drive axles 15 and 17, with each drive axle 15 and 17 having its own permissible torque range as explained above. After initiation (*), e.g., an ignition or key-on event, the method 100 begins with step S102, wherein the controller 35 of FIG. 1 evaluates current vehicle system conditions, including whether for instance an electronic stability control (ESC) system is active or a traction control system (TCS) is activated for the particular drive axle 15 or 17 being evaluated. The method 100 proceeds to step S103 if such conditions are present. The method 100 proceeds in the alternative to step S104 if the vehicle conditions are not detected.

Step S103 includes ensuring that the system found to be active in step S102 has a torque range sufficient for its proper operation. For instance, a chassis torque window 42 of a threshold torque range may be recorded in memory (M) of the controller 35 and used in step S103. After such a control action is completed, the method 100 resumes anew with step S102.

Step S104 is performed for the other drive axle from that which was evaluated in step S102. If a TCS system is active for the drive axle 15 or 17 being evaluated in step S104, the method 100 proceeds to step S105. Otherwise, the method 100 proceeds to step S106.

At step S105, an optimally efficient axle torque operating point is set to a point on the driver-requested torque line minus actual axle torque already delivered to the drive axle evaluated in step S102. The torque range is set in step S105 to a calibrated range sufficient for achieving the optimally efficient axle torque operating point. Effectively, step S105 ensures that if a TCS system is active only on the prior considered drive axle, the controller 35 attempts to meet the optimally efficient axle torque operating point. The method 100 then resumes with step S102.

Step S106 entails detecting a dynamic driving maneuver. Step S106 includes determining if a desired yaw rate as determined via such dynamic inputs such as speeds of the vehicle 10 or drive wheels 14 from the speed sensors ($N_{17}$, $N_{18}$, $N_{14}$), the steering angle (arrow $\theta_{21}$), actual yaw rate (arrow Y), and the accelerator pedal position (arrow $CC_{25}$) equals or exceeds a calibrated dynamics value, which in turn may be determined as a function of road-tire coefficient of friction and a velocity of the vehicle 10, as is known in the art. If so, the method 100 proceeds to step S107. Otherwise, the method 100 proceeds to step S108.

At step S107, the controller 35 applies a relatively large chassis torque window 42 during the duration of the dynamic driving maneuver, as shown for instance in FIG. 2A. The method 100 then proceeds to step S112.

At step S108, the controller 35 determines if the accelerator pedal position (arrow $CC_{25}$) of the accelerator pedal 25 of FIG. 1 exceeds a calibrated threshold. If so, the method 100 proceeds to step S107. Otherwise, the method 100 proceeds to step S110.

Step S110 includes applying a relatively small chassis torque window 42, e.g., as shown in FIGS. 2B and 2C. The adjustment of the size of the chassis torque window 42 ensures that the chassis torque window 42 shrinks during dynamic driving maneuvers. The method 100 proceeds to step S112, indicated in FIG. 7A as () and described in detail in FIG. 7B**.

Step S112 of FIG. 7B, which is a continuation of FIG. 7A, entails determining if there is a threshold amount of slip of the drive wheels 14 of either drive axle 15 or 17 with respect to the surface on which the vehicle 10 is traveling. Such slip, as is known in the art, may be determined via the speed sensors $S_{14}$, $S_{17}$, and/or $S_{18}$. The method 100 proceeds to step S113 when the threshold amount of slip is detected. Otherwise, the method 100 proceeds to step S114.

At step S113, the controller 35 determines that the drive wheels 14 for the axle under evaluation are slipping relative to a threshold. As a result, the controller 35 determines that there is a need to limit the maximum allowed axle torque and commands this action via the torque control signals (arrow 11) shown in FIG. 1.

At step S114, the controller 35 determines whether the drive wheels 14 on the other drive axle are slipping at a higher rate than the drive wheels 14 of the drive axle under consideration. If so, the method 100 proceeds to step S115. Otherwise, the method 100 proceeds to step S116.

Step S115 entails ensuring, via operation of the controller 35, that the lesser-slipping axle 15 or 17 provides sufficient traction force for meeting the driver-requested torque that is as closely attainable relative to the limits of the chassis torque window 42.

At step S116, the controller 35 determines that neither drive axle 15 or 17 is slipping, and as a result can use any point along the driver-requested torque line, e.g., torque line 43 of FIG. 2A within the boundaries of the chassis torque window 42.

Step S118 includes setting the chassis torque window 42 in any suitable manner based on the present longitudinal and lateral vehicle dynamics as determined by the various dynamics sensors shown in FIG. 1. The method 100 is finished after step S118, as indicated by (*) in FIG. 7B**.

Use of the method 100 and powertrain 10P described herein is therefore intended to optimally adjust the size or orientation of the chassis torque window 42 in a wide range of possible driving conditions. As a result, optimization of the fuel economy of the propulsion system components is enabled during normal driving operations, as is a state of charge-based automatic biasing of a torque split between drive axles 15 and 17 depending on state of charge of the ESS 22. Component level protection is enabled by the coordination of chassis torque window 42 with the component torque window 44. These and other possible advantages will be readily appreciated by those of ordinary skill in the art in view of the disclosure.

While the best modes for carrying out the disclosure have been described in detail, those familiar with the art to which this disclosure relates will recognize various alternative designs and embodiments for practicing the disclosure within the scope of the appended claims.

What is claimed is:

1. A powertrain system comprising:
   a propulsion system having first and second torque sources responsive to a driver-requested torque, wherein a torque line defines a two-dimensional range of theoretically-attainable torque distributions from the first and second drive sources meeting the driver-requested torque;
   first and second drive axles that are respectively connected to and independently driven by the first and second torque sources, wherein a permissible range of torque contribution from the first and second torque sources to the respective first and second drive axles is defined by a component torque window;
   a plurality of sensors operable for detecting a dynamic driving maneuver of a vehicle having the powertrain; and
   a controller programmed to automatically adjust at least one of a size and an orientation of a chassis torque window during the detected dynamic driving maneuver, the chassis torque window defining dynamics-based torque limits of the first and second torque sources, to determine an optimally efficient axle torque operating point that falls on the torque line within the component torque window at an intersection of boundaries of the component torque window and the torque line in a closest-attainable proximity to the chassis torque window, such that the controller is configured to selectively violate the chassis torque window, and to command a torque contribution from the first and second torque sources, via transmission of torque control signals to the first and second torque sources to achieve the optimally efficient axle torque operating point.

2. The powertrain system of claim 1, wherein the controller is programmed to selectively adjust the torque contribution from the first and second torque sources by commanding a reduction in a torque commanded by the torque control signals to at least one of the first and second drive axles.

3. The powertrain system of claim 1, wherein the plurality of sensors includes a plurality of speed sensors, a yaw rate sensor, and a steering angle sensor.

4. The powertrain system of claim 1, wherein the controller is operable for receiving a selected driving mode from a drive mode selection device, and for adjusting the torque contribution from the first and second torque sources in response to the selected driving mode such that the optimally efficient axle torque operating point falls entirely outside of the chassis torque window.

5. The powertrain system of claim 1, further comprising an energy storage system having a state of charge, wherein the controller is programmed to adjust the torque contribution from the first and second torque sources in response to the state of charge.

6. The powertrain system of claim 5, wherein the controller is programmed to adjust the torque contribution from the first and second torque sources such that the optimally efficient axle torque operating point falls entirely outside of the chassis torque window.

7. The powertrain system of claim 1, wherein the first and second torque sources include an electric machine.

8. The powertrain system of claim 7, wherein the first and second torque sources include an internal combustion engine.

9. The powertrain system of claim 1, wherein the controller is programmed to selectively adjust the output torque contribution from the first and second torque sources in response to a selected driving mode from a driving mode selection device such that the optimally efficient axle torque operating point falls within the chassis torque window during the dynamic driving maneuver.

10. The powertrain system of claim 1, wherein the controller is operable for detecting slip of a road wheel of one of the first or second drive axles, and to limit, via the torque control signals, a maximum allowed axle torque to the first or second drive axles having the detected slip.

11. A method for coordinating torque limits of a chassis and a propulsion system of a vehicle having first and second drive axles, wherein the propulsion system includes first and second torque sources respectively connected to and independently powering the first and second drive axles and responsive to a driver-requested torque, wherein a torque line defines a two-dimensional range of theoretically-attainable torque distributions from the first and second drive axles meeting the driver-requested torque, and wherein a permissible range of a torque contribution of the first and second torque sources to the respective first and second drive axles is defined by a component torque window, the method comprising:
   adjusting at least one of a size and orientation of a chassis torque window via a controller during a dynamic driving maneuver, the chassis torque window defining dynamics-based torque limits of the first and second torque sources;
   determining an optimally efficient axle torque operating point that falls on the torque line within the component torque window at an intersection of boundaries of the component torque window and the torque line in a closest-attainable proximity to the chassis torque window, such that the controller is configured to selectively violate the chassis torque window; and
   selectively adjusting a torque contribution from the first and second torque sources, via transmission of torque control signals from the controller to the first and second torque sources, to achieve the optimally efficient axle torque operating point.

12. The method of claim 11, wherein selectively adjusting the torque contribution includes commanding a reduction in a torque command to at least one of the first and second torque sources via the torque control signals.

13. The method of claim 11, further comprising detecting the dynamic driving maneuver using a plurality of sensors including speed sensors, a yaw rate sensor, and a steering angle sensor.

14. The method of claim 11, wherein the vehicle includes an energy storage system having a state of charge, and wherein selectively adjusting the torque contribution occurs in response to the state of charge.

15. The method of claim 14, wherein selectively adjusting the torque contribution in response to the state of charge occurs such that the optimally efficient axle torque operating point falls entirely outside of the chassis torque window.

16. The method of claim 11, wherein selectively adjusting the torque contribution from the first and second torque sources occurs in response to receiving a selected driving mode signal from a driving mode selection device.

17. The method of claim 16, wherein selectively adjusting the torque contribution from the first and second torque sources in response to the selected driving mode includes setting the optimally efficient axle operating point entirely outside of the chassis torque window.

18. The method of claim 16, wherein selectively adjusting the torque contribution in response to the selected driving mode occurs such that the optimally efficient axle torque operating point falls within the chassis torque window during the dynamic driving maneuver.

19. The method of claim 11, wherein the first and second torque sources are an internal combustion engine and an electric machine.

20. The method of claim 11, wherein each of the first and second drive axles include a road wheel, the method further comprising detecting slip of one of the road wheels, wherein selectively adjusting the torque contribution includes limiting, via the torque control signals, a maximum allowed axle torque to the first or second drive axles having the road wheel with the detected slip.

* * * * *